Patented May 8, 1923.

1,454,604

UNITED STATES PATENT OFFICE.

WORTH H. RODEBUSH, OF BALTIMORE, MARYLAND, ASSIGNOR TO U. S. INDUSTRIAL ALCOHOL CO., A CORPORATION OF WEST VIRGINIA.

PROCESS OF MAKING GLYCOL.

No Drawing.      Application filed June 28, 1919. Serial No. 307,432.

*To all whom it may concern:*

Be it known that I, WORTH H. RODEBUSH, a citizen of the United States, residing at Baltimore, in the State of Maryland, have invented a certain new and useful Improvement in Processes of Making Glycol, of which the following is a specification.

My invention relates particularly to a process of making glycol, and has reference especially to the making of glycol from glycol esters.

The object of my invention is to provide a process by means of which glycol may be made in an advantageous manner from glycol esters. Another object of my invention is to provide a process by means of which glycol may be readily made from a glycol ester, such for example as glycol diacetate or monoacetate, glycol propionate or glycol butyrate with the acid of a catalytic agent. Again, another object is to provide a process which may be operated continuously, and in which the entire quantity of glycol ester will be changed to glycol and the new ester formed will be continually removed. Still another object of my invention is to provide a process by means of which glycol may be made from the mixed alcohol and glycol diacetate as obtained in my application upon process of making esters, Serial No. 295,748, filed May 8th, 1919.

Further objects of my invention will appear from the detailed description thereof contained hereinafter.

While my invention is capable of being carried out in many different ways, for the purpose of illustration I shall describe only certain ways of carrying out the same hereinafter.

For example in carrying out my invention, I may proceed as follows:

An alcoholic solution of a glycol ester is heated with a small quantity of an acid, such for example as sulphuric acid in the following proportions:

200 parts by weight of ethyl alcohol, 100 parts by weight of glycol diacetate, 2 parts by weight of sulphuric acid (66° Bé.).

It will be understood that another alcohol may be used instead of the ethyl alcohol, as for example methyl alcohol. Also another glycol ester may be used, such for example as glycol propionate or glycol butyrate. Again, instead of sulphuric acid another catalyst may be used, as for example hydrochloric acid, acetic acid, or sodium acid sulphate. The acid which is used may be either strong or weak acid. The mixture is heated in the case of the above example from 70° to 100° C., and at these temperatures ethyl actate and glycol will be formed, and the continued heating will continually distill off the ethyl actate with some ethyl alcohol while the small amount of residual ethyl alcohol will be removed by continued heating. The ethyl acetate and ethyl alcohol may be recovered by condensation and separated in any desired manner. After the ethyl acetate and alcohol have thus been removed, the glycol is distilled off either at atmospheric pressure at a temperature of 190° C., or under diminished pressure with a temperature of 120° C.

For producing the glycol, instead of mixing together ethyl alcohol and glycol diacetate as above indicated, the liquid formed in my application upon Process of Making Esters, Serial No. 295,748, filed May 8th, 1919, hereinabove described, and which comprises a mixture of glycol mono acetate, glycol diacetate and ethyl alcohol, may be used instead.

While I have described my invention above in detail, I wish it to be understood that many changes may be made therein without departing from the spirit thereof.

I claim:

1. The process which comprises making glycol by subjecting a glycol ester and an alcohol to a catalyst with the application of heat, while distilling off the ester formed in the reaction.

2. The process which comprises making glycol by subjecting a glycol ester and an alcohol to a catalyst with the application of heat, while distilling off the ester formed in the reaction, and then distilling off the glycol formed.

3. The process which comprises making glycol by subjecting glycol diacetate and alcohol to a catalyst with the application of heat, while distilling off the ester formed in the reaction.

4. The process which comprises making glycol by subjecting the glycol ester and an alcohol to a catalyst of an acid character with the application of heat.

5. The process which comprises making glycol by subjecting the glycol ester and an alcohol to a catalyst of an acid character with the application of heat while distilling off the ester formed in the reaction.

6. The process which comprises making glycol by subjecting the glycol ester and an alcohol to a catalyst of an acid character with the application of heat while distilling off the ester formed in the reaction, and then distilling off the glycol formed.

7. The process which comprises making glycol by subjecting glycol diacetate and alcohol to a catalyst of an acid character with the application of heat.

In testimony that I claim the foregoing, I have hereunto set my hand this 5th day of June, 1919.

WORTH H. RODEBUSH.